2,763,688

BIPHENYLENE DIAMINES USEFUL IN PRODUCING POLYAMIDES

Ray Clyde Houtz and Emerson La Verne Wittbecker, West Chester, Pa., assignors to E. I. du Pont de Nemours and Company, Wilmington, Del., a corporation of Delaware No Drawing. Original application November 26, 1947, Serial No. 788,314. Divided and this application October 15, 1952, Serial No. 314,958

6 Claims. (Cl. 260—570.8)

This invention relates to organic amino compounds, particularly organic diamines having an aromatic nucleus.

This case is a division of our copending application Serial No. 788,314, filed November 26, 1947, now Patent 2,685,573.

Nylons of the type produced in United States Patents Nos. 2,071,250; 2,071,251 and 2,130,948 are very useful in melt spinning techniques in the production of fibers and fabrics. Their low solubility in common organic solvents, however, makes the preparation of films difficult. Further, these polyamides absorb usually above 5% of water. This absorption, though considerably lower than that of rayon, for example, limits their use in certain applications. Certain polyamides previously prepared have been found to have the desired solubility, but the films from these have shown high water absorption and relatively low stiffness, especially when wet. These disadvantages prompted a search for other polyamides and their intermediate diamines, whereupon the novel diamines of the present invention were discovered.

This invention has as an objective the preparation of novel diamines having an aromatic nucleus. A further object comprises a class of diamines having unusual properties making them useful as intermediates in the synthesis of linear polyamides soluble in readily available volatile solvents.

According to the present invention, diamines useful in the manufacture of polyamides of improved solubility are provided; these diamines may be prepared by a process wherein aromatic compounds containing at least two carbonyl groups, the carbon atom of each carbonyl group being bonded to an aromatic nucleus and to an alkyl radical, are catalytically hydrogenated in the presence of ammonia or are first reacted with hydroxylamine and then catalytically reduced. This invention comprehends provision of diamines of formula

where Ar is a biphenylene group and R is an alkyl group containing from one to twenty carbon atoms; particularly included is p,p'-di(1-aminoethyl)biphenyl or 4,4'-bis(1-aminoethyl)biphenyl.

The aromatic dioxo compound may be prepared, for example, by Friedel-Crafts reaction in which an aromatic hydrocarbon, a catalyst, an inert solvent and two mols per mol of aromatic hydrocarbon of an acyl halide are placed in a reaction vessel and refluxed for three hours. The product, after decomposing the reaction mixture with water, is isolated by filtration and purified by recrystallization from appropriate solvents. The dioxo compound is then treated with hydroxylamine or its equivalent and the corresponding dioximes so formed are reduced catalytically. The catalyst is removed from the reaction mixture by filtration and the product is purified by distillation.

The resultant diamine is convertible to synthetic linear polyamides, for example, by reaction with dibasic acids.

These polyamides, having the desired combination of properties, have an intrinsic viscosity of at least 0.4 and a unit length of at least 7 as defined in United States Patents Nos. 2,071,253 and 2,130,948. Particularly useful are the polyamides having at least 50% of the amide groups derived from the above diamines and yielding, on hydrolysis with dilute acids, such as hydrochloric acid, substantial amounts of the acid salts of the particular diamines and at least one dicarboxylic acid. Minor amounts of polymerizable lactams, such as caprolactam, as well as minor amounts of other polyamide-forming diamines or of other dibasic acids, may also be used. From interpolymers formed using such ingredients, corresponding diamine salts and dicarboxylic acids or amino-acids in the case of lactams are obtained on hydrolysis.

A preferred method of obtaining these polyamides involves the mixing of essentially molecular equivalent amounts of a dibasic acid and the above-mentioned type of diamine, for example, p,p'-di(1-aminoethyl) biphenyl, in an alcoholic medium. The salt so formed is isolated by filtration and, after drying, is heated in an inert atmosphere or under vacuum for several hours at temperatures of usually 200° to 300° C. to obtain the macromolecular fiber-forming polyamide. The polyamides may be obtained by any of the well-known procedures such as those described in the above patents using the diamines of this invention and dibasic acids or amide-forming equivalents of either.

The following detailed examples, in which parts are by weight, are given to illustrate certain preferred processes for practicing the present invention. It is understood that the specific embodiments are illustrative only and not limitative

Example 1

This example describes the preparation and properties of p,p'-di(1-aminoethyl) biphenyl.

Eighty parts of anhydrous aluminum chloride was suspended in 95 parts of anhydrous carbon bisulfide. Over a period of twenty minutes, 34 parts of biphenyl and 47 parts of acetyl chloride dissolved in 95 parts of anhydrous carbon bisulfide were added to the stirred, refluxing aluminum chloride/carbon bisulfide suspension. The reaction mixture was then stirred and refluxed for three hours. After removing the solvent by evaporation, the residue was poured slowly into 500 parts of chipped ice, thereby decomposing the reaction mixture. The solid product, p,p'-diacetylbiphenyl, was filtered and recrystallized from absolute alcohol. It melted at 190° C.

To a slurry of 50 parts of p,p'-diacetylbiphenyl, 60 parts of hydroxylamine hydrochloride, 316 parts of ethyl alcohol and 40 parts of water, 84 parts of flake sodium hydroxide was added slowly with stirring. The mixture was refluxed for ten minutes and then added to 2,000 parts of water, neutralized with concentrated hydrochloric acid and cooled. The dioxime of p,p'-diacetylbihphenyl precipitated and was filtered from the mother liquor. It was purified by recrystallization from dimethyl formamide. It melted at 260° C. with decomposition.

Thirty parts of the dioxime of p,p'-diacetylbiphenyl, 79 parts of absolute alcohol and 5 parts of Raney nickel were shaken under 1,500 pounds per square inch of hydrogen pressure at 80° C. for two hours. The reaction mixture was filtered to remove the catalyst. The product and the alcohol were separated by distillation. The p,p'-di(1-aminoethyl)biphenyl boiled at 184° C. under 2 mm. pressure and had a neutral equivalent of 124.

Essentially equivalent amounts of p,p'-di(1-aminoethyl)biphenyl (10.6 parts) and sebacic acid (8.6 parts) were dissolved separately in warm ethanol and then mixed. The resulting insoluble salt was separated by filtration and dried. The salt was sealed in an evacuated glass tube and that was heated at 220° C. for one and a half hours, after which time the tube was unsealed and the contents were heated for an additional two hours at 270° C. under 2 mm. vacuum. The clear, viscous melt, on cooling, formed a transparent amber solid which had a softening point of about 190° C. The intrinsic viscosity in meta-cresol of the polyamide was 0.6 when measured as described in United States Patent No. 2,130,948. The polyamide was manually spinnable and was spun into filaments and melt pressed into clear films. It was substantially soluble in chloroform or methylene chloride or their mixtures with methanol, and had the relatively low water absorption of 3%.

In contrast, the closest polyamide homolog known to the art, that obtained from p-bis(2-aminoethyl) benzene and sebacic acid, is essentially insoluble in the above solvents and has a greater water sensitivity.

*Example II*

This example describes the preparation of p,p'-di(1-aminoisobutyl)biphenyl and the preparation of a polyamide from it and sebacic acid.

To an agitated mixture of 135 parts of anhydrous aluminum chloride in 190 parts of anhydrous carbon bisulfide was slowly added a solution of 106 parts of isobutyryl chloride and 55 parts of biphenyl in 252 parts of anhydrous carbon bisulfide. The rate of addition was such that gentle refluxing was maintained. The mixture was then refluxed with stirring for four hours after which the carbon bisulfide was removed by distillation, and the residue was poured slowly into 1,000 parts of chipped ice. The resulting solid was filtered and recrystallized from absolute alcohol. The dioxime of the resulting p,p'-diisobutyrylbiphenyl was prepared under the conditions described in Example I, using 60 parts of the diketone, 60 parts of hydroxylamine hydrochloride, 395 parts of alcohol, 50 parts of water and 85 parts of flake sodium hydroxide. Fifty parts of the dioxime of p,p'-diisobutyrylbiphenyl, 79 parts of absolute alcohol and 10 parts of Raney nickel were placed in a reaction vessel and treated for two hours with hydrogen under a pressure of 1,500 pounds per square inch and at 80° C. The product, p,p'-di(1-aminoisobutyl)biphenyl, was purified by distilling, first removing the catalyst by filtration.

The salt of p,p'-di(1-aminoisobutyl)biphenyl and sebacic acid was prepared under conditions employed in Example I. A polyamide was prepared from this salt by heating it in a sealed tube at 220° C. for two hours and then under 2 mm. pressure at 270° C. for two hours. The polyamide was obtained as an amber transparent plug. It was soluble in an azeotropic mixture of chloroform and methanol. From its solution in these solvents, clear, tough films could be cast. The films had good stiffness, clarity and low water-sensitivity. Since film dimensions change very little when films are subjected to variations in humidity, the films of this polyamide are especially useful as photographic films.

*Example III*

This example describes the preparation of p,p'-di(1-aminopropyl)-m,m'-dimethylbiphenyl and the preparation of a polyamide from it and sebacic acid.

A mixture of 45.5 parts of m,m'-dimethylbiphenyl, 73 parts of aluminum chloride and 505 parts of anhydrous carbon bisulfide was stirred while 120 parts of propionic anhydride was slowly added to it. After the addition of the anhydride was complete, the mixture was stirred and refluxed for two hours. The diketone was isolated under the conditions described in Example I. To obtain the diamine, 54 parts of the p,p'-dipropionyl-m,m'-dimethylbiphenyl, 39 parts of absolute alcohol, 41 parts of liquid ammonia and 8 parts of Raney nickel were placed in an appropriate pressure vessel and treated with hydrogen at 2,000 pounds per square inch pressure at 110° C. for two hours. The resulting p,p'-di(1-aminopropyl)-m,m'-dimethylbiphenyl was purified by filtration followed by distillation.

Equivalent weights of p,p'-di(1aminopropyl)-m,m'-dimethylbiphenyl and sebacic acid were mixed as described above, converting the materials to the salt. The heating cycle employed was that used in Example I. The resulting, transparent polyamide was manually spinnable and was soluble in chloroform-methanol mixtures.

*Example IV*

Stearyl chloride and biphenyl were reacted as described above to produce a dioxo compound which was converted by hydrogenation in similar manner to p,p'-di(1-amino-n-octadecyl)biphenyl. 68.8 parts of this diamine and 20.2 parts of sebacic acid were converted to the salt and the salt to the polymer in the usual way. This polymer could be melt pressed or cast into clear films which had very low water absorptions.

The novel diamines of this invention exemplified above and represented by the structural formula previously mentioned are particularly the 4,4' or p,p' product. This may be separated from isomers by distillation, for example. As shown in Example III the aromatic diamine can contain substituents on the aromatic nucleus. Similarly, m,m'-dimethyl-p,p'-diacylbiphenyl and other alkyl substituted diphenyls are useful as starting materials.

The diamines of this invention are particularly useful in the preparation of synthetic linear polyamides and other condensation polymers. The unique position of the amino groups makes possible the formation of a variety of novel polyamides having properties making them useful in the formation of textile fibers, bristles, molding compositions, films and water-proof coating compositions for metals, fabrics and miscellaneous materials. Further, these diamines are useful as intermediates for dyestuffs, pharmaceuticals, bactericides, insecticides, inhibitors, preservatives, etc. Diamines of the type described can be polymerized with dibasic acids other than sebacic acid. Likewise, other polymerizable diamines or polymerizable lactams such as caprolactam may be employed in minor amounts. To obtain the desired properties of solubility and low water absorption, it is preferred that at least 50% of the amide groups in the polyamide be derived from the previously described bis(1-amino-1-alkylmethyl) aromatic hydrocarbons.

Particularly useful in the preparation of such materials are these new diamines having two (1-amino-1-alkylmethyl) groups and readily obtained by reacting aromatic compounds such as biphenyl with an excess of an acyl halide in the presence of a polyvalent element halide as Friedel-Craft's catalyst, such as aluminum chloride, and subsequently hydrogenating the dioxo compound so formed in the presence of ammonia, for example.

It is preferred that the polyamides be obtained by reacting the above described type of diamine with a dibasic acid having at least three carbon atoms between carboxylic acid groups and preferably less than twenty carbon atoms. For example, adipic acid, pimelic acid, suberic acid, sebacic acid and terephthalic acid may be employed. Thus, aromatic dibasic acids may be used and the aliphatic dibasic acids are of the type $HOOC(CH_2)_nCOOH$ wherein $n$ is 3 to 20. The preferred dibasic acids are sebacic acid and adipic acid.

We claim:

1. Diamine of formula

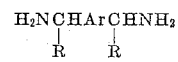

where Ar is a biphenylene group and R is an alkyl group containing from one to twenty carbon atoms.

2. The composition of claim 1 in which Ar is

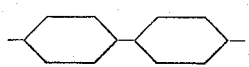

and is joined at the dangling bonds to the indicated C atoms.

3. 4,4'-bis(1-aminoethyl)biphenyl.
4. 4,4'-bis(1-aminoisobutyl)biphenyl.
5. 4,4'-bis(1-amino-n-octadecyl)biphenyl.
6. 3,3'-dimethyl-4,4'-bis(1-aminopropyl)biphenyl.

References Cited in the file of this patent

UNITED STATES PATENTS

| | | |
|---|---|---|
| 2,130,948 | Carothers | Sept. 20, 1938 |
| 2,464,692 | Kirk et al. | Mar. 15, 1949 |
| 2,464,693 | Kirk et al. | Mar. 15, 1949 |

OTHER REFERENCES

Fries et al.: "Chem. Abst." (1936), vol. 30, pp. 4489–90.

Von Braun et al.: "Chem. Abst." (1917), vol. 11, p. 2676.